Aug. 30, 1955     F. J. CANTALUPO     2,716,427
FLOW CONTROL WASHER
Filed May 28, 1951
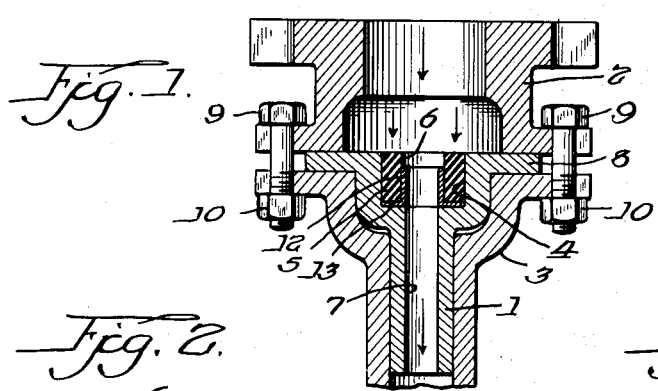
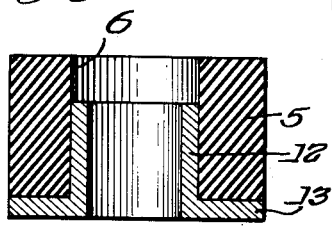
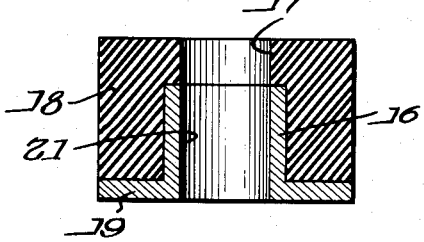
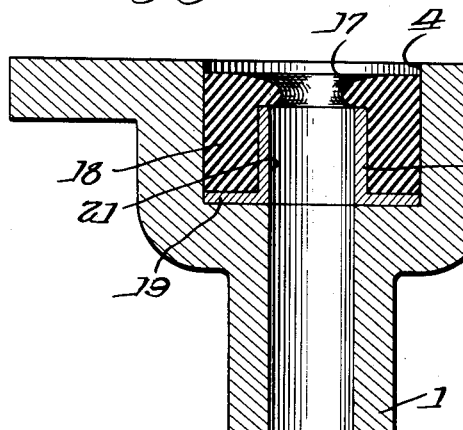
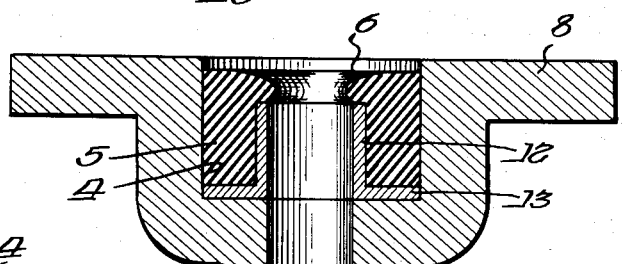
Inventor.
Francis J. Cantalupo.
By Joseph O. Lange United States Patent Office 2,716,427
Patented Aug. 30, 1955

2,716,427

FLOW CONTROL WASHER

Francis J. Cantalupo, Chicago, Ill., assignor to Crane Co., Chicago, Ill., a corporation of Illinois Application May 28, 1951, Serial No. 228,584

2 Claims. (Cl. 138—45)

This invention relates to a fluid flow control device.

More particularly, it is concerned with an improvement over the various types of similar control devices of a resilient washer-like material, such as that shown in my co-pending U. S. patent application, Serial No. 41,040, filed July 28, 1948, now Patent 2,667,900, February 2, 1954.

Numerous experiments with a flow control device of the type disclosed in the above referred to application have shown that device to be frequently unsatisfactory when subjected to high pressures under which the device will collapse. Thus, the herein disclosed device is an improvement over that construction.

It is an important object of this invention to provide a fluid flow control device which is relatively simple in construction and effects the accurate and sensitive control of the flow of fluids at varying fluid temperatures and pressures.

Another important object of this invention is to provide for a flow control device, in which a relatively large variety of materials can easily be used in the construction of the device without detracting from its excellent performance, such materials can comprise rubber, synthetic compositions, plastics, resilient materials, and the like.

Still a further object of this invention is to provide a fluid flow control device which is easily removed from its assembled position for purposes of repair or replacement of the device.

Other objects and advantages will become more readily apparent upon reading the following description in light of the accompanying drawings, in which:

Fig. 1 is a fragmentary sectional assembly view showing the flow control device installed within a pressure vessel and when devoid of line fluid pressure.

Fig. 2 is a magnified view of one embodiment of the flow control device as a single unit.

Fig. 3 is a magnified view of another embodiment of the flow control device as a single unit.

Fig. 4 is a magnified view of the flow control device shown in Fig. 2 under the influence of line fluid pressure.

Fig. 5 is a magnified view of the flow control device shown in Fig. 3 under the influence of fluid pressure.

Similar reference numerals refer to similar parts throughout the several views.

Referring now to Fig. 1, a nozzle, generally designated 1, is clamped between two complementary members 2 and 3 forming a pressure-retaining body in any suitable manner, so as to be maintained in fluid tight relation, with the nozzle 1 preferably mounted telescopically within the member 3 to extend axially therewithin as illustrated. The nozzle 1 is provided with a cylindrical chamber 4 in which is placed the novel fluid flow control distortable or compressible member 5, being preferably snugly disposed therewith as shown. It is preferred that the member 5 is formed from a rubber material, but it should be understood that any resilient material, such as a synthetic composition or plastic, could be beneficially employed, depending on the nature of the service involved.

The control device 5 is shaped as indicated with a central passage 6 axially aligned with the chamber 4, thereby to provide an extension of the bore 7 of nozzle member 1. It should be noted that the chamber 4 is relatively larger than nozzle bore 7 with the fluid control member or washer 5 having an outside diameter corresponding to the diameter of the chamber 4. Thus, it will be apparent that the control device is shouldered within the nozzle member 1, while the entire construction provides for substantially a unitary central flow aperture therethrough.

It should further be noted that in this description of the entire construction, an annularly flanged portion 8 of the nozzle 1 is received between oppositely disposed flanges of the member 2 and 3 to serve as a gasket member therebetween and effect the above referred to fluid tight relation. To complete assembly of the construction, a plurality of bolts 9 with corresponding nuts 10 are engaged in the oppositely disposed flange portions of members 2 and 3 to secure the same as shown.

Referring again to the flow control device 5, it will be seen that a ferrule member 12 is positioned with the control device 5 as hereinafter described. The general shape of the ferrule 12 is preferably cylindrical, while being provided with a lower annularly flanged outwardly extending portion 13 which is positioned on the base portion of the nozzle chamber 4. It will thus be apparent that the fluid control device 5 and the ferrule member 12 are completely received within the outer limits of the chamber 4, while the inner diameter of the cylindrical portion of the ferrule 12 is shown to project within the flow passage of the nozzle member 1, as shown. The length of the ferrule is predeterminately related to the length of the compressible member 5 which, therefore, has an unsupported portion for the remainder of its length.

As shown in Figs. 3 and 5, a variation in the arrangement of the ferrule member 12, with respect to the flow control device may also be constructed. Thus, as shown in Fig. 2, the ferrule is arranged to project within the aperture of the flow control device 5, as the outside diameter of the cylindrical portion of the ferrule 12 is snugly fitted within the central aperture 6 of the fluid flow control member. A variation of this construction which is shown in Figs. 1 and 2, is shown in Fig. 3, wherein the ferrule 16 is molded or countersunk within the internal diameter 17 of a resilient fluid control device 18 with a lower annularly flanged portion 19 of the ferrule 16 forming the base of the assembly. In this construction, it will be apparent that the bore or aperture 17 of the control device and the internal diameter 21 of the ferrule are aligned to provide a continuous and uniform diameter of the flow passage therethrough. The choice between these variations shown in Figs. 2 and 3 would be dependent upon working conditions encountered in the field.

Figs. 4 and 5 are enlarged views of the nozzle member 1, shown in Fig. 1, with the fluid flow control devices of Figs. 2 and 3 respectively disposed therewithin and as they appear when subjected to line fluid pressure. It will be noted that the reaction as shown in the drawings is that of slightly compressing the resilient control devices 5 and 18 by means of the fluid pressure acting thereupon. Since the resilient devices cannot expand outwardly within the chamber 4 of nozzle 1, the internal diameters of the members 5 and 18 are radially lessened, as shown in the drawings, thereby to reduce the size of flow aperture through the control device as indicated. Thus, a portion of the resilient control devices which extends above the upper limit of the respective ferrule members is compressed inwardly under line fluid pressure to effect a corresponding reduction in internal diameters of the resilient members in proportion to the intensity of fluid pressure to thereby effect an adjustable flow aperture through the control device.

It will thus be understood, in considering the action of the fluid flow control devices under the influence of line fluid pressure, the following occurs: at low fluid pressures, flow through the central aperture of the device is in an unrestricted manner. As the fluid pressure is increased, force is applied by the fluid against the upstream surface of the resilient material causing the unsupported portion above the upper limits of the ferrule to be forced inwardly and thereby restrict the aperture to prevent an increase in the flow rate at that pressure. Thus, at varying fluid pressures, the aperture is correspondingly varied to give the desired result of a relatively constant flow rate over a range of varying pressures. By proper selection of the resilient material, and also considering the dimensions of the resilient material relative to the ferrule, the range of varying fluid pressures, over which the device is effective, can be easily accurately controlled within finer limits than heretofore.

Obviously, for the control devices to be effective as described above, at least a portion of the internal diameters thereof must be free to be compressed inwardly. The ferrule members can extend only a predetermined distance along to inner bores of the devices with the precise distance being critical in the operation of the control device. It should be understood that employment of a reinforcing member such as the ferrule provides for the accurate control of fluid flow at higher fluid pressures than heretofore permitted with the control devices of the prior art. The use of the ferrule supported in the manner of this invention avoids the collapse or excessive reduction of the inner diameter of the resilient device under high pressures and it also results in a more accurate flow control over a greater range of fluid pressure changes.

In light of the above description, it will be apparent that a simple and effective fluid flow control device has been invented. It is not the intent to be limited by the specific constructions and applications shown herein as numerous changes could be made within the scope of the appended claims.

I claim:

1. The combination in a flow control means in a body having a chamber with an upstream and downstream portion, a distortable rubber-like annular member snugly receivable within the said body chamber for its full length and having a central flow aperture therethrough, a relatively rigid annular reinforcing member of shorter length than the said rubber-like annular member and of continuous L-section with an inwardly projecting reduced annular longitudinal portion snugly receivable within the central flow aperture of said distortable member to closely contact the wall portion thereof for a predetermined length thereof and support the latter portion against deformation inwardly within the flow aperture, the remainder of the length of the said distortable member being annularly unsupported except for the outer periphery thereof within the body chamber and being free to compress and deform circumferentially inwardly thereby to reduce the diameter of the central flow aperture for a distance substantially measured longitudinally by the said inner unsupported portion of the said distortable member, the said unsupported end portion of the said distortable member extending substantially beyond the upstream end of the reduced annular portion of the said rigid reinforcing member and deforming annularly inwardly upon the application predeterminately of fluid pressure against a transverse exposed end surface of the distortable member adjacent the upstream end of the said body chamber.

2. The combination in a flow control means in a body having a chamber defined at one end thereof by a shoulder between an upstream and downstream portion thereof, a distortable rubber-like annular member snugly receivable within the said body chamber for substantially its full length and having a central flow aperture therethrough, a relatively rigid annular reinforcing member of continuous L-section having a reduced annular portion snugly receivable within the central flow aperture of said distortable member to closely contact the wall portion thereof for a distance substantially less than the overall length of said distortable annular member and support the latter portion against deformation inwardly within the flow aperture, the said annular reinforcing member being supported in end abutting relation upon the shoulder of said chamber, the latter abutting support being for the full width of the said chamber shoulder, the remaining length of the said distortable member being unsupported except for its outer periphery adjacent the upstream portion of said body and being free to distort annularly inwardly thereby to reduce the diameter of the central flow aperture for a distance substantially measured longitudinally by the unsupported inner peripheral portion of the said distortable member in response to the fluid pressure applied against an end annular surface on the said distortable member adjacent the body chamber upstream portion.

References Cited in the file of this patent

UNITED STATES PATENTS

| | | |
|---|---|---|
| 2,236,967 | County | Apr. 1, 1941 |
| 2,354,538 | Parker | July 25, 1944 |
| 2,389,134 | Brown | Nov. 20, 1945 |
| 2,515,073 | Binnall et al. | July 11, 1950 |
| 2,568,519 | Smith | Sept. 18, 1951 |